though this could be done in many ways, we have here chosen to use a solenoid to open the valve between the container and the measuring chamber.

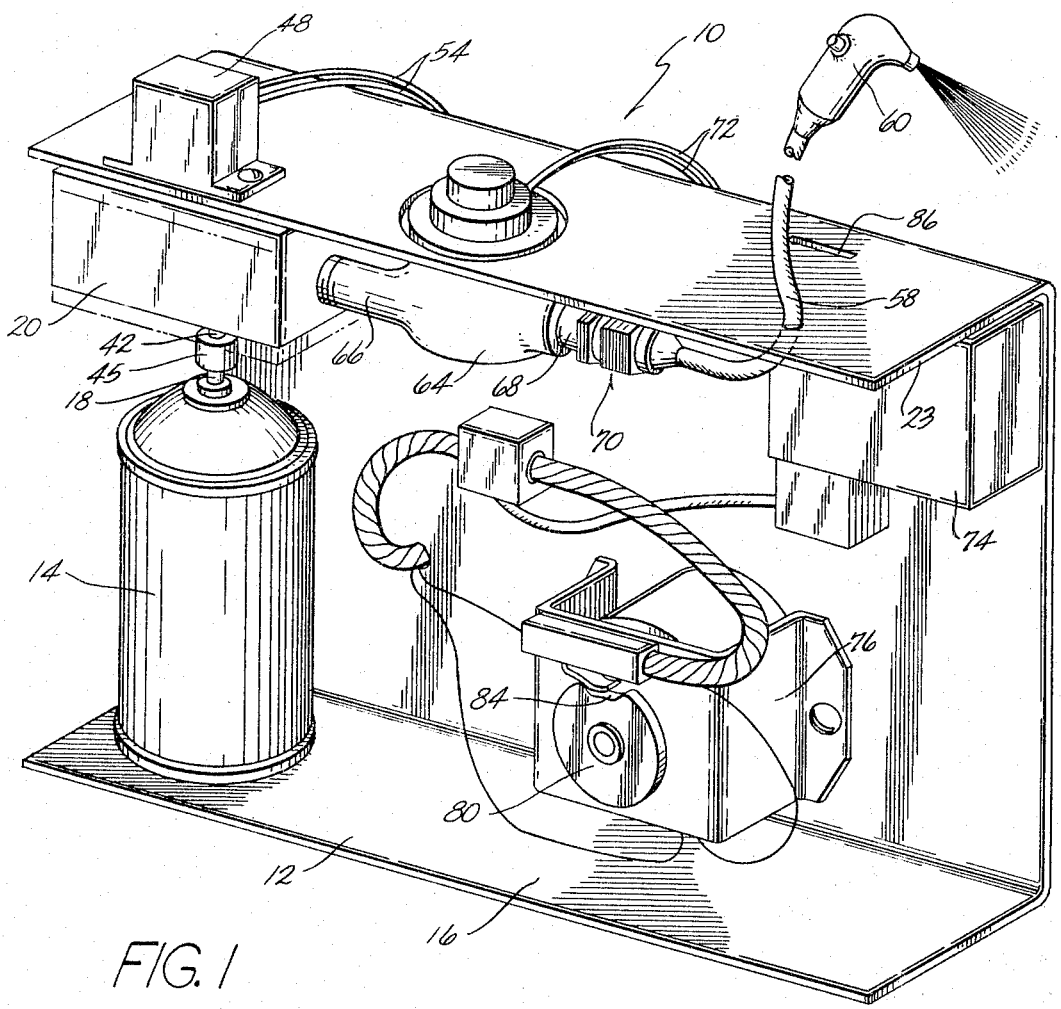

United States Patent Office
3,321,107
Patented May 23, 1967

3,321,107
DISPENSING DEVICE
Charles T. Govin, Wauwatosa, and Erhardt C. Koerper, Delafield, Wis., assignors to Koerper Engineering Associates, Inc., Milwaukee, Wis., a corporation of Wisconsin
Filed Aug. 19, 1965, Ser. No. 480,971
10 Claims. (Cl. 222—2)

This invention relates to dispensing devices and, more particularly, to devices for dispensing an agent contained in a pressurized liquified gas propellant.

An important object of the invention is the provision of a dispensing device having means defining a separate measuring chamber in communication with a container which stores the dispensing agent under pressure. The measuring chamber is filled with the gas propellant containing the agent to determine the quantity of agent to be dispensed.

Another object of the invention is the provision of a single wall dispensing hose communicating with the measuring chamber to afford discharge of the contents of the measuring chamber. The dispensing hose includes a manually or remotely operable nozzle for selectively discharging spurts of the contents of the measuring chamber.

Still another object of the invention is the provision of first and second valves respectively controlling discharge of the container to the measuring chamber and the discharge of the measuring chamber to the dispensing hose and nozzle. The dispensing device includes coin operated or other suitable timing means for initiating and sequentially actuating the first and second valves for certain periods of time. Actuation of the coin operated timing means actuates the first valve to afford filling of the measuring chamber, after which the second valve is actuated in timed relation to the first valve to afford discharge of the measuring chamber contents through the dispensing hose and nozzle.

Other objects and advantages will become apparent from the following description and accompanying drawings in which:

FIGURE 1 is a perspective view of a dispensing device embodying various of the features of the invention; and FIGURE 2 is an enlarged sectional view of a portion of the dispensing device shown in FIGURE 1.

Referring to the drawings and, more particularly, to FIGURE 1, the dispensing device of the invention is broadly identified by the numeral 10. The dispensing device 10 includes a suitable frame 12 for mounting thereon the various components which comprise the dispensing device 10. Although various constructions can be employed, in the specifically illustrated construction, the frame 12 is of U-shape. Supported on a bottom flange 16 of the frame 12 is a storage container 14, which stores liquified gas propellant containing the agent to be dispensed. The container 14 is a conventional dispensing type container and includes a valved outlet 18 which includes normally closed valve means affording discharge of the container contents in response to depression of the valved outlet 18.

Communicating with the storage container 14 for receiving a predetermined amount of agent from the container 14 is means defining a measuring chamber. Various constructions can be employed. In the illustrated embodiment, the measuring chamber defining means (shown in cross section in FIGURE 2) comprises a housing 20 which is formed with a measuring chamber 22 and which is movably disposed on a top flange 23 of the frame 12 for vertical movement relative to the valved outlet 18 to afford agent flow from the container 14. In this regard, the measuring chamber housing 20 is generally disposed directly above the container 14 and is guided for vertical movement by guide bolts 24 received in bores 26 in the housing 20. The housing 20 is biased toward a raised position adjacent the top flange 16 by springs 28 located in encircling relation to the bolts 24. As shown in FIGURE 2, each spring 28 is disposed between a land 30 formed by a counter-bored portion 32 of the bore 26 and a bolt head 34. The housing 20 is shown in FIGURES 1 and 2 in the raised position by solid lines and in a lowered position by broken lines.

Communicating between the chamber 22 and the container 14 to afford filling of the measuring chamber 22 is a normally closed valve means 39. In the preferred embodiment shown in FIGURE 2, the valve means 39 includes a passageway 40 comprising a valve conduit or tubular member 42 which is closed at its upper end and which is movably carried in bore 43 in the housing 20 and which includes openings 44 in the conduit side wall. At its lower end, the conduit 42 is fitted with a guide collar 45 to receive and position the valved outlet 18 of the container 14 in communication with the conduit 42.

The valve means 39 is normally closed by a biasing spring 46 disposed between the top wall of the chamber 22 and the closed end of the conduit 42. The valve means 39 is opened by moving the housing 20 to the lowered position, shown in broken lines in FIGURES 1 and 2, in which case the end of the container's valved outlet 18 engages the end of the conduit 42 to thereby depress the valved outlet 18 and to simultaneously raise the conduit 42 against the biasing force of the spring 46, thereby communicating the apertures 44 with the measuring chamber 22, to afford discharge of the agent from the container 14 to the measuring chamber 22 through the passageway 40.

Means in the form of an electromagnetic means, such as solenoid 48, is provided for moving the house 20 to the lowered position. The solenoid 48 is carried on the top flange 23 directly above the measuring chamber housing 20 and includes a movable shaft 50 (see FIGURE 2) passing through a bore 52 in the top flange 23, which shaft 50 is connected to the housing 20. The solenoid 48 includes leads 54 for connection to a suitable power source (not shown) for actuation of the solenoid 48. Energization of the solenoid 48 moves the shaft 50 downwardly, which, in turn, correspondingly moves the housing 20 to afford opening of the valve means 39 in a manner as previously described.

A single wall dispensing tube or hose 58 is provided for delivering the contents of the measuring chamber 22 to a manually operable spray nozzle 60 carried on one end of the dispensing hose 58. Valve means is provided for affording communication between the other end of the dispensing hose 58 and the measuring chamber 22 to afford selective discharge of the contents of the measuring chamber 22 upon manually opening the spray nozzle 60. In the preferred embodiment, such means includes an outlet passageway 62 formed in the housing 20 and in communication with the chamber 22. As shown in FIGURE 2, the passageway 62 communicates with the chamber 22 at the bottom thereof to assure proper delivery of the agent from the measuring chamber and to prevent foaming during discharge which could occur if the outlet were located above the bottom of the chamber in an area in which separation of the agent and liquified gas might result in a gas pocket or accumulation.

Disposed between the outlet passageway 62 and the other end of the dispensing hose 58 is a normally closed valve 64 which affords controlled discharge of the contents of the measuring chamber 22 to the hose 58. The valve 64 is connected to the housing 20 by any suitable means, such as a threaded pipe 66. The valve 64 is connected to the other end of the hose 58 by any suitable means such as threaded pipe 68 and coupling 70. The second valve 64 is a conventional electromagnetically operable type which opens upon energization thereof through leads 72 connected to a suitable power source (not shown).

Coin operated timing means is provided for sequentially actuating the valves 39 and 64 to afford agent flow into the measuring chamber 22 from the container 14 and discharge of the agent from the measuring chamber 22 when the spray nozzle 60 is manually opened. In the preferred embodiment, the coin operated timing means includes a coin receiver 74 and a timing motor 76 which, together with the solenoid 48 and electromagnetic valve 64, are included in an actuating circuit. The timing motor includes a cam 80 operable to energize the solenoid 48 operating the valve 39. More specifically, the cam 80 includes a slot or cutaway 84 which determines the interval during which the valve 39 is open. The circuit is arranged so that during the remainder of the cycle the valve 64 is opened.

In operation, insertion of a coin in the coin receiver 74 through the coin slot 86 affords actuation of the timing motor 76, which timing motor rotates the cam 80 one revolution. The solenoid 48 is energized, and the normally closed valve 39 is opened for a predetermined period of time, namely the time interval required for the motor 76 to rotate the cam 80 through the radial angle subtended by the slot 84, to thereby afford filling of the measuring chamber with agent, as previously described. Then the solenoid 48 is deactivated and the valve 39 is returned to its normally closed position, after which the valve 64 is activated to thereby open the valve 64 and communicate the measuring chamber 22 with the dispensing nozzle 60, as previously described. The valve 64 is held open for the time interval required for the timing motor to complete the remainder of one revolution of the cam 80. During this time interval, a user can selectively discharge the contents of the measuring chamber 22 by manually opening the spray nozzle 60 as previously described. Upon completion of one revolution of the cam 80, the valve 64 is deactivated and returned to its normally closed position.

Various of the features of the invention are set forth in the following claims.

What is claimed is:

1. A device for dispensing an agent contained in a liquified gas propellant, said device comprising a container for storing the liquid gas propellant containing the agent, means defining a measuring chamber, normally closed first valve means communicating between said container and said measuring chamber, a dispensing hose, a manually operable spray nozzle at the discharge end of said dispensing hose, normally closed second valve means communicating between said measuring chamber and said dispensing hose, a timing motor, means operated by said timing motor for sequentially opening said first and second valve means to respectively afford filling of said measuring chamber and discharge of the contents of said measuring chamber, and coin operated means for actuating said timing motor.

2. A device for dispensing an agent contained in a liquified gas propellant, said device comprising a storage container for the liquid gas propellant containing the agent, a measuring chamber, normally closed first valve means communicating between said storage container and said measuring chamber, a dispensing hose, a manually operable spray nozzle at the discharge end of said dispensing hose, normally closed second valve means communicating between said measuring chamber and said dispensing hose, a timing motor, means operated by said timing motor for sequentially opening said first valve means to afford filling of said measuring chamber, closing said first valve means, opening said second valve means to afford discharge of the contents of said measuring chamber upon opening of said spray nozzle, and closing said second valve means to complete a cycle of operation, and coin operated means for actuating said timing motor as aforesaid.

3. A device for dispensing an agent stored under pressure in a storage container, said device comprising means defining a measuring chamber, electrically controlled first valve means controlling flow relative to said chamber and adapted to communicate with the container, an electrically controlled second valve means controlling flow relative to said measuring chamber, and coin operated timing means for electrically controlling said first and second valve means in timed relation to each other to sequentially afford agent flow to and from said measuring chamber.

4. A device for dispensing an agent under pressure, said device comprising means defining a measuring chamber, a replaceable container containing the agent under pressure and including a valved outlet removably communicating with said measuring chamber, a second valve means communicating with said measuring chamber, and coin operated timing means for actuating said valved outlet and second valve means in timed relation to each other to sequentially afford agent flow to and from said measuring chamber.

5. A device for dispensing an agent under pressure, said device comprising a container for storing the agent under pressure, means defining a measuring chamber, a solenoid operated first valve means communicating between said chamber and said container, an electromagnetically operable second valve means communicating with said measuring chamber, and coin operated electrical timing means for actuating said first and second valve means in timed relation to each other to sequentially afford agent flow to and from said measuring chamber.

6. A device for dispensing an agent under pressure, said device comprising a container for storing the agent under pressure, means defining a measuring chamber including an outlet passageway communicating with said chamber adjacent the bottom of said chamber, first valve means communicating between said chamber and said container, a dispensing hose, second valve means communicating between said dispensing hose and said passageway, and timing means for sequentially actuating said first and second valve means to respectively afford agent flow to said measuring chamber and agent discharge from said measuring chamber through said outlet passageway and from said dispensing hose.

7. A device for dispensing an agent contained in a liquified gas propellant stored in a container, said device comprising means defining a measuring chamber, normally closed first valve means controlling flow to said measuring chamber, a dispensing hose, normally closed second valve means communicating between said measuring chamber and said dispensing hose, and means for sequentially opening said first and second valve means to respectively afford filling of said measuring chamber and discharge of the contents of said measuring chamber.

8. A device for dispensing an agent contained in a liquified gas propellant stored in a container, said device comprising means defining a measuring chamber, normally closed first valve means controlling flow to said measuring chamber, a dispensing hose, a manually operable spray nozzle at the discharge end of said dispensing hose, nomally closed second valve means communicating between said measuring chamber and said dispensing hose, a timing motor, means operated by said timing motor for sequentially opening said first and second valve means to respectively afford filling of said measuring chamber and discharge of the contents of said measuring chamber, and coin operated means for actuating said timing motor.

9. A device for dispensing an agent contained in a liquified gas propellant stored in a container, said device comprising a measuring chamber, normally closed first valve means controlling flow to said measuring chamber, a dispensing hose, a manually operable spray nozzle at the discharge end of said dispensing hose, normally closed second valve means communicating between said measuring chamber and said dispensing hose, a timing motor, means operated by said timing motor for sequentially opening said first valve means to afford filling of said measuring chamber, closing said first valve means, opening said second valve means to afford discharge of the contents of said measuring chamber upon opening of said spray nozzle, and closing said second valve means to complete a cycle of operation, and coin operated means for actuating said timing motor as aforesaid.

10. A device for dispensing an agent contained in a liquified gas propellant stored in a container, said device comprising means defining a measuring chamber including an outlet passageway communicating with said chamber adjacent the bottom of said chamber, first valve means communicating between said chamber and the container, a dispensing hose, second valve means communicating between said dispensing hose and said passageway, and timing means for sequentially actuating said first and second valve means to respectively afford agent flow to and from said measuring chamber.

References Cited by the Examiner
UNITED STATES PATENTS

| | | | |
|---|---|---|---|
| 2,855,926 | 10/1958 | Koppelman. | |
| 2,928,573 | 3/1960 | Edelstein | 222—70 |
| 3,079,044 | 2/1963 | Flynn | 222—2 |
| 3,208,574 | 9/1965 | Anson | 194—3 |

ROBERT B. REEVES, *Primary Examiner.*

STANLEY H. TOLLBERG, *Examiner.*